United States Patent

[11] 3,589,462

[72] Inventors Masakazu Inagaki
No. 18, Honzin Dori, 4-Chome, Nakamura Ku, Nagoya;
Jo Tsuda, No. 1066, Aza Taido, Oaza Kita-Mazima, Oharu Mura, Ama-gun Aichi-ken, both of, Japan
[21] Appl. No. 758,917
[22] Filed Sept. 10, 1968
[45] Patented June 29, 1971

[54] MOTOR VEHICLE PARKING MECHANISM
3 Claims, 9 Drawing Figs.
[52] U.S. Cl. ........................................... 180/1
[51] Int. Cl. ................................... B60k 7/00, B62d 43/06
[50] Field of Search .......................... 180/1 B, 1 A

[56] References Cited
UNITED STATES PATENTS
2,455,133  11/1948  Moffat .......................... 180/1 (B)
FOREIGN PATENTS
449,068  6/1949  Italy ............................ 180/1 (B)

*Primary Examiner*—A. Harry Levy
*Attorneys*—Robert E. Burns and Emmanuel J. Lobato ABSTRACT: Mechanism for moving a vehicle laterally within a space corresponding to the length of the vehicle, for easy parking thereof. A pivotally mounted leg on the vehicle rotatably supports motor-driven spare wheel and tire. The leg is pivotally operable from a raised position, in which the spare tire is housed in the rear of the vehicle and, to a lowered position in which the tire engages a surface and raises the rear end of the vehicle in condition for moving the vehicle rear laterally. A hooked lift member is supported on the leg and is rendered effective automatically, as the support leg is lowered and raised, to engage the rear axle housing to support the arch of the vehicle so that the rear wheels are lifted with the vehicle as it is raised.

MOTOR VEHICLE PARKING MECHANISM

This invention relates generally to motor vehicles and more particularly to apparatus for lifting the rear end of the vehicle without any appreciable decrease in stability, and for easily parking the vehicle by moving the rear end of the vehicle laterally without advancement or backing of the vehicle.

Motor vehicles provided with the standard steering systems must generally execute several rearward and forward movements in parallel parking. Moreover, the space within which such vehicles are parked must provide for the forward and rearward movement of the vehicle during the parking operation. In crowded streets the parking of vehicles generally will delay traffic increasing traffic hazards. Furthermore, in many instances parking spaces having sufficient length to receive a vehicle therein may not be taken advantage of because the vehicle driver cannot maneuver the vehicle into position. The parking of the usual vehicle results in much waste of time and energy.

It is a principal object of the present invention to provide an apparatus or mechanism for moving a vehicle laterally within a space corresponding to its length for easy parking thereof.

Another object of the present invention is to provide a mechanism by which a vehicle can be maneuvered into position for making sharp turns or moved laterally on icy road surfaces, facilitating turning of the vehicle and avoiding of undesirable or otherwise unsafe roadway surfaces.

According to the invention, a leg is pivotally mounted on the vehicle and rotatably supports a spare wheel and tire thereon. The leg is moved from a raised position in which the spare wheel and tire are housed within the rear trunk or compartment of the vehicle and lowered to a lowered position in which the tire engages a roadway surface. A vehicle lift element or device is automatically rendered effective by the leg for engaging the rear axle housing and lifting the rear end of the vehicle so that the rear wheels are clear of the ground when the spare tire is in its operative position engaging the roadway surface. In this position the vehicle can change its direction laterally by driving of the spare wheel and tire with a drive device.

Other features and advantages of the parking system in accordance with the present invention will be better understood as described in the following specification and appended claims, in conjunction with the following drawings in which:

Figure 1:
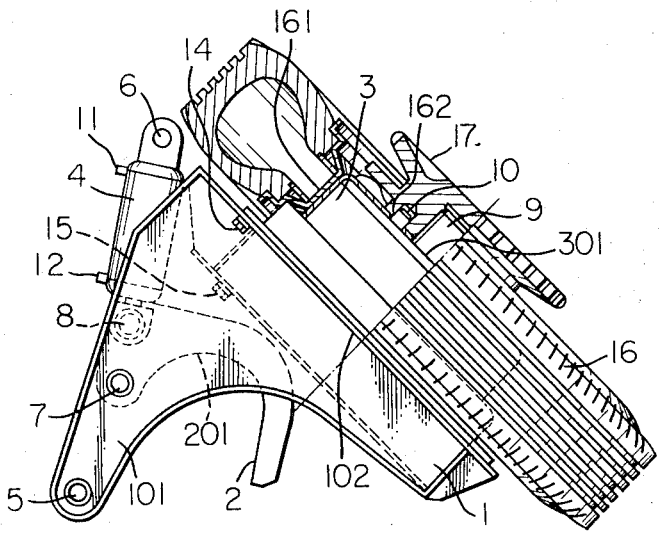
FIG. 1 is a side elevation view, partly in section, of a mechanism according to the invention.
Figure 2:
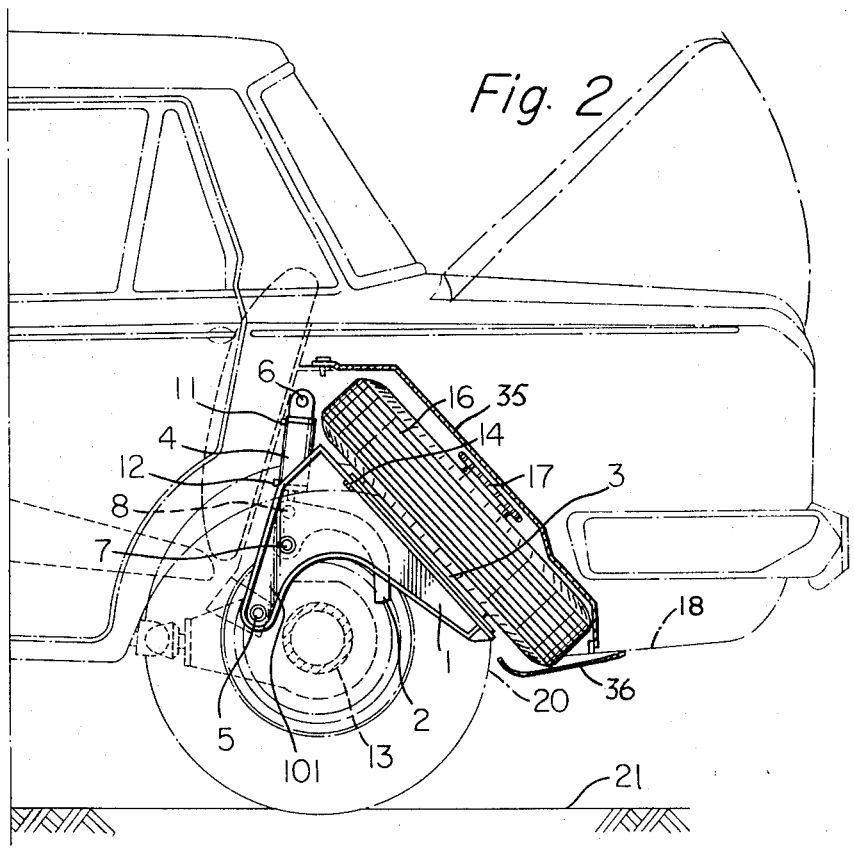
FIG. 2 is a fragmentary side elevation view of a vehicle provided with a parking mechanism or system of the type shown in FIG. 1 and illustrating a spare wheel, tire mechanism raised and housed in a trunk compartment.

According to the drawings, a leg 1 is pivotally mounted about a pivot 5 on a chassis 18 or suitable frame part of a vehicle as illustrated in FIG. 2. The leg is provided with a lift device 2 having a base portion 201 and a hook portion rendered effective for lifting the rear end of the vehicle as later described. A drive motor or power unit 3 is mounted on a support surface 102 of the leg 1 with bolts 14, 15 for driving a rotatable part 301 of the power unit to which is removably fixed a spare wheel and tire generally designated 16. The rotatable part 301 has angularly spaced pins 10 corresponding to usual mounting holes 162 on a wheel rim 161 and engaged therein. A mounting member or wheel nut 17 is threaded on to a driven member 9 of the power unit so that the wheel and tire 16 can be removably fixed on the power or drive unit 3 for reversible drive thereof in operation.

A hydraulic jack or cylinder 4 is connected to the vehicle frame or chassis 18 at a pivot 6 and connected to the lift device 2 at a pivot 8, for rotating the leg 1 about its pivot 5 and the hook 201 freely about a pivot 7 on the leg 1. The hydraulic jack or cylinder 4 is provided with hydraulic fluid from a hydraulic pump, illustrated diagrammatically, under control of a control system likewise illustrated diagrammatically as a block. The delivery of hydraulic fluid is selectively controlled by the vehicle driver or operator for rotating the leg 1 from a raised position as illustrated in FIG. 2, in which the spare wheel and tire combination 16 is housed or stored in a recess or space within the vehicle body, wherein such space constitutes part of the usual trunk of the vehicle. It is to be understood that the trunk can be constituted so that there is access to the spare tire through the opening of the trunk of the vehicle by removal of a cover 35 which defines the forward wall of the trunk. A dust shield 36 made of flexible plastic or rubber assists in enclosing the spare tire on the underside of the vehicle.

Figure 3:
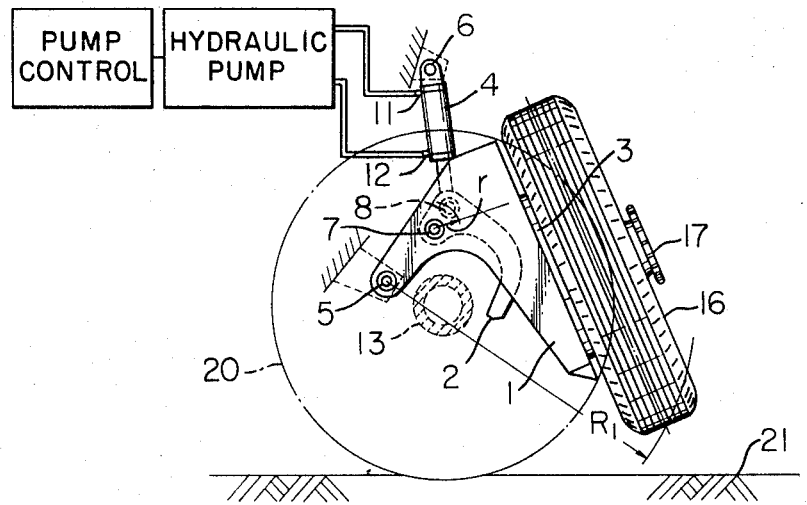
FIG. 3 is a fragmentary diagrammatic illustration of the mechanism in the vehicle of FIG. 2 being lowered.
Figure 4:
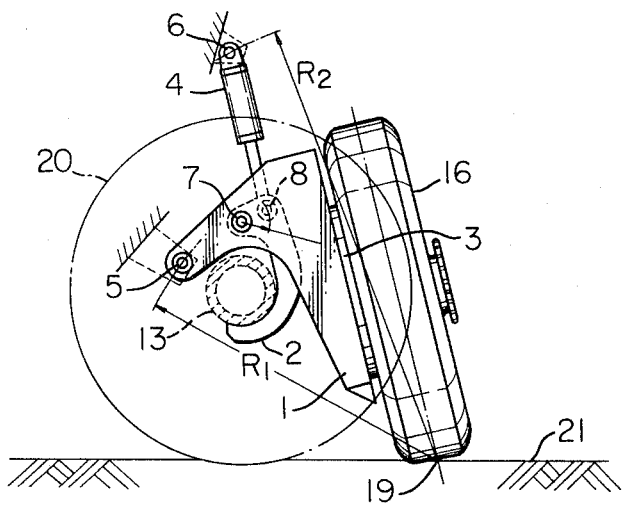
FIG. 4 is a diagrammatic view of the apparatus or mechanism in FIG. 3, illustrating the no-load engagement of a spare tire on a roadway surface.
Figure 5:
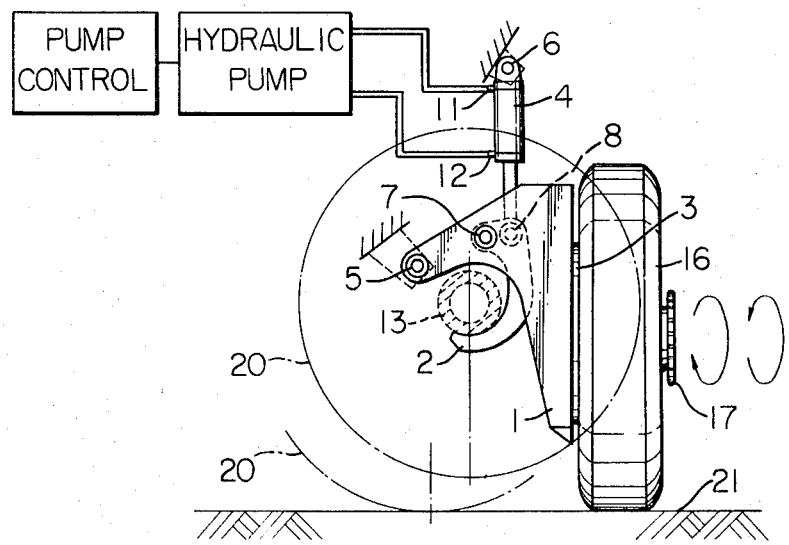
FIG. 5 is a fragmentary side elevation view of mechanism according to the invention illustrating the mechanism in its lowered operative position wherein the rear wheels of the vehicle of FIG. 1 are raised clear of the roadway surface.

When hydraulic fluid under pressure is provided through a conduit 11, under control of the vehicle operator, the piston of the hydraulic cylinder connected to the lift arm or hook 2 will rotate, the leg 1 downwardly about the pivot 5, so that the lower end of the tire describes an arc having a radius $R_1$, and then, when the leg 1 has passed the position shown in FIG. 3, and the pin 8 has crossed the line connecting pins 5 and 7, the piston will rotate the hook 2 and the pin 8 about the pivot 7 along an arc of radius $r$. As the leg 1 is rotated downwardly the spare tire will engage a roadway surface 21 at a point 19, and there the leg 1 stops moving. Continued supply of hydraulic fluid through conduit 11, after the roadway surface is engaged by the spare tire, will continue to rotate the lift element 2 so that it positions itself under a rear axle housing 13 and rotates the pins 5 and 6 clockwise along arcs having radii $R_1$ and $R_2$ respectively, around the point 19. Such movement causes the rear end of the vehicle to be lifted so that the rear wheels 20 are lifted clear of the roadway surface and the car is supported by the spare tire 16.

The lifting of the rear end of the vehicle will be effected because the clockwise rotation of the leg 1 is about the point 19 which acts as a pivot point since the spare tire engages the road surface. Thus the vehicle is lifted as the pins or pivots 5, 6 move along their respective aforementioned arcs. The upper end of the leg 1 is in effect rotated clockwise so that the pivot 5 moves upwardly, and the leg 1 is positioned in a final operative lowered position such that the axis of rotation of the spare wheel is substantially horizontal and parallel to the roadway surface 21. In this condition the pivots 6, 8 at opposite ends of the hydraulic jack are substantially in a common vertical plane and have moved from a position forwardly of the axis of rotation of the rear wheels, to a position rearwardly thereof, It will be understood that the relative positions of the various pivots and connections 5, 6, 7, 8 of the members 1, 2, 4, are illustrated in the drawing at the raised position of the spare wheel and tire 16. The lowering intermediate positions and the final lowered position to effect the raising of the vehicle rear wheels, are as shown in FIGS. 2, 3, 4 and 5.

In order to return the spare wheel and tire to a retracted or raised position, pressure fluid is applied through a conduit 12 and the supply conduit 11 becomes a discharge conduit, whereas in the lowering operation the conduit 12 acts as a discharge line. As the piston in the hydraulic cylinder 4 is retracted, the lift arm 2 is rotated counterclockwise and lowers the rear wheels 20 into the position shown in FIG. 4, and the leg 1 assumes a position such that the spare tire is inclined in the manner of FIG. 4 and is eventually retracted to its rest position in a raised condition as illustrated in FIG. 2. Change of direction may be performed in the raised position of the rear part by means of the power unit 3, as shown in FIGS. 6 and 7.

Figure 6:
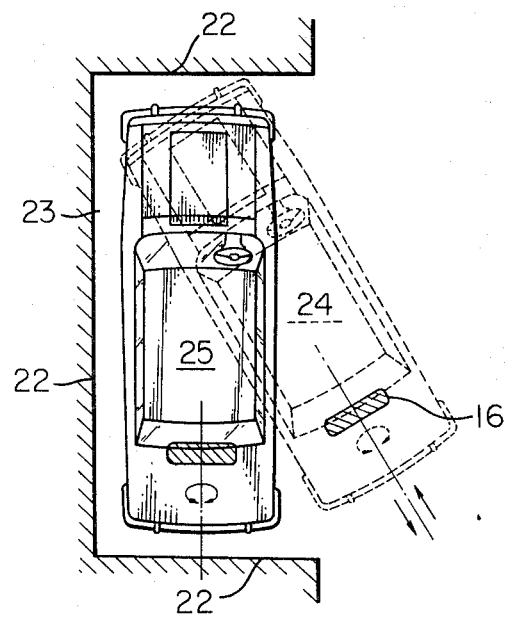
FIG. 6 is a diagrammatic plan view illustrating the parking of the vehicle provided with apparatus according to the invention.

The mechanism readily makes it possible to park a vehicle substantially within its own length as illustrated in FIG. 6. Thus, as illustrated in the drawings, an obstacle 22 defines a parking space 23 and is approached by vehicle 24 illustrated in the approach in broken lines. The parking mechanism has the axis of rotation of the wheel and tire 16 in a plane corresponding to the longitudinal plane of symmetry of the vehicle. The mechanism is operated to lower the spare wheel and tire combination 16, and the motor 3 is driven so that the vehicle rear end is moved toward the obstacles 22 which define the parking. In order to leave the parking space the motor 3 is driven in an opposite direction so that the vehicle is returned to the position illustrated in broken lines, and the parking mechanism is retracted so that the vehicle may then be backed clear.

Figure 7:
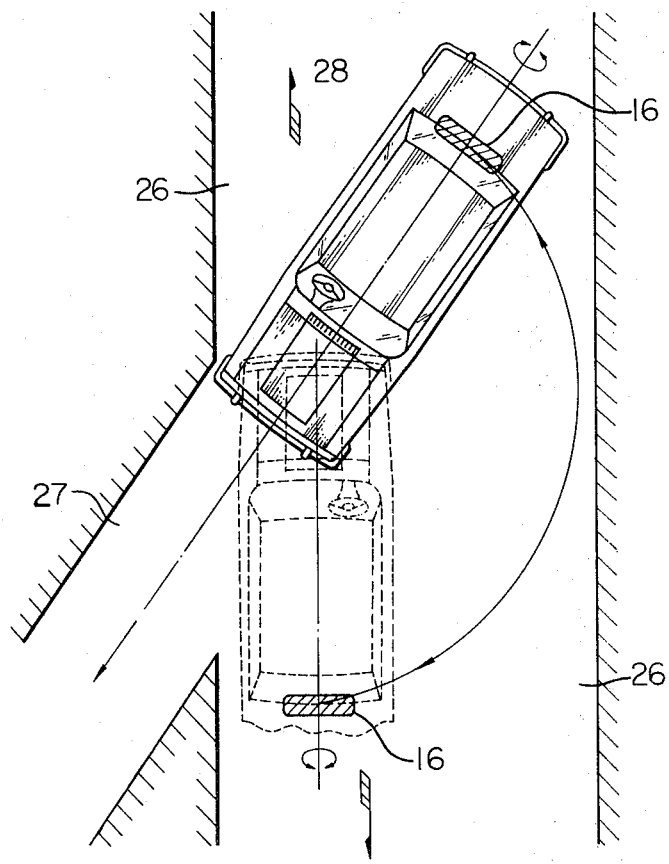
FIG. 7 is a plan diagrammatic view of a vehicle, provided with the invention, illustrating the use of apparatus according to the invention for making a sharp turn.

The invention is usable not only for parking but for steering of the vehicle and turning it through very sharp turns, as illustrated in FIG. 7, in which a vehicle provided with the invention is illustrated as moving on a roadway 26 in the direction of an arrow 28. When it is intended to turn the vehicle into a roadway 27, which makes a very sharp angle with the other roadway 26, the vehicle is driven to the position illustrated in broken lines while the mechanism of the invention is operated as before described and the vehicle is rotated to the position illustrated in solid lines. The vehicle can then advance along the roadway 27 in the usual manner after having retracted the mechanism of the invention.

Figure 8:
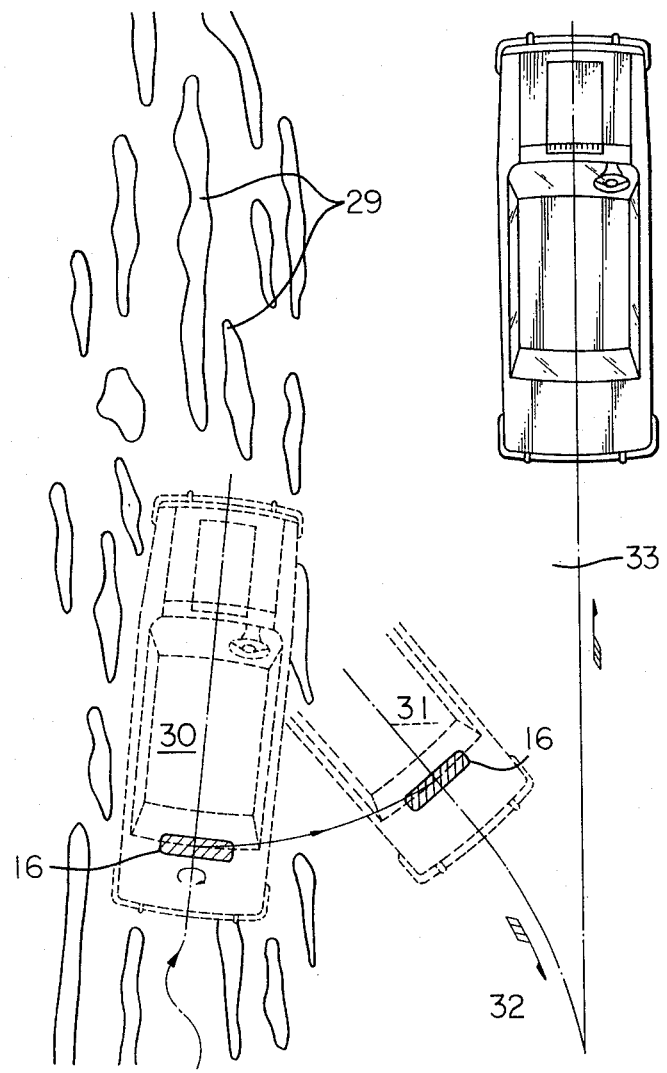
FIG. 8 is a plan view diagrammatically illustrating lateral movement of a vehicle, provided with apparatus according to the invention, to a portion of a roadway clear of surfaces sought to be avoided.

The mechanism according to the invention may be used to assist in steering a vehicle clear of slippery areas such as icy areas as illustrated in FIG. 8. In the drawing, areas 29 are representative of icy or slippery spots or areas on the roadway 33, with the vehicle 30 in a position over the dangerous areas. The mechanism is operated as heretofore described and the vehicle rear end rotated laterally to the position 31, at which time the vehicle can be backed in the direction of the arrow 32 onto a roadway surface that is safe, whereupon the vehicle can be driven away as illustrated in the drawing in solid lines.

Figure 9:
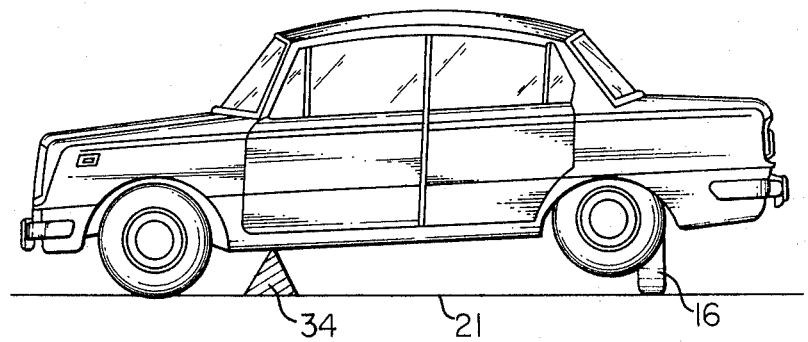
FIG. 9 is a side elevation view of a vehicle, provided with apparatus according to the invention, illustrating the use of the apparatus for lifting or jacking-up the vehicle.

Although the mechanism or system according to the invention is usable for parking, it can be used simply for "jacking up" the car as illustrated in FIG. 9. The mechanism is lowered in the rear and a fulcrum 34 may be provided on a roadway surface 21 so that the vehicle is uplifted and supported.

As to changing direction of the car, those skilled in the art will understand that the motor unit 3 is reversible and may be an electric motor controlled by the vehicle operator through control circuitry not illustrated in the drawing. The circuitry may provide flexible connections to the motor and energization from the vehicle battery, not shown. Moreover, the motor 3 may be a fluid driven motor with fluid connections, not shown, to the illustrated hydraulic pump. The supply of current or fluid under pressure and control thereof is accomplished with conventional elements. The control mechanism can provide for automatically turning off electric current or pressure fluid as the case may be by use of limit switches and valves as the mechanism is housed, etc.

While a preferred embodiment of the invention has been shown and described, it will be understood that many modifications and changes can be made within the true spirit and scope of the invention.

What we claim and desire to be secured by Letters Patent is:

1. A mechanism for supporting a spare wheel and tire for enabling directional change of a motor vehicle by lifting one end thereof, comprising a support assembly including a main leg frame and axle support means pivotally coupled together for relative pivotal movement about an axis parallel to an axle of the vehicle, a spare wheel rotatably attached to the main leg frame for rotation about an axis disposed centrally of the vehicle and perpendicular to said axle of the vehicle, wherein said axle support means comprises a curved member for pivotal movement to hook under said axle of the motor vehicle, and said main leg frame is pivotally attached to the motor vehicle for pivotal movement about an axis disposed parallel to said axle of the vehicle and inwardly thereof, extendable piston-cylinder means having one end pivotally attached to curved member of said axle support means at a pivotal axis which is offset from the axis of the pivotal connection between said main leg frame and said curved member, and said piston-cylinder means having its other end pivotally attached to said motor vehicle along a pivotal axis disposed above said axle, wherein said piston-cylinder means retracts to position the support assembly and spare wheel upwardly within the body of the motor vehicle, and extends to pivotally swing the support assembly downwardly so that the tire engages the ground and the axle support means hooks under the axle with said piston-cylinder means disposed in a substantially vertical position, whereupon further extension thereof causes a separation between the main leg frame and said connection between the piston-cylinder means and the motor vehicle, thereby jacking said one end of the vehicle upwardly while the curved member of said axle support means holds said axle in a stationary relation with respect to the raised motor vehicle.

2. The invention as set forth in claim 1 further comprising drive means for said spare wheel, wherein said drive means is mounted on said main support frame and within the rim of said spare wheel.

3. The invention as set forth in claim 1, in which said main leg frame has a threaded shaft protruding coaxially with said spare wheel, said spare wheel has a rim having a central opening for receiving said shaft, and further comprising an internally threaded hub for reception by said shaft for holding said spare wheel on said shaft, whereby said support assembly permits removal of said spare wheel from said main support frame when said piston-cylinder means is retracted.